United States Patent [19]

Stenzel

[11] Patent Number: 4,742,528
[45] Date of Patent: May 3, 1988

[54] COMPENSATION FOR POWER FEED LINE WEIGHT IN WEIGHT MEASUREMENT DEVICES

[75] Inventor: Otto Stenzel, Gründau, Fed. Rep. of Germany

[73] Assignee: Leybold-Heraeus GmbH, Fed. Rep. of Germany

[21] Appl. No.: 895,890

[22] Filed: Aug. 12, 1986

[30] Foreign Application Priority Data

Aug. 12, 1985 [DE] Fed. Rep. of Germany ....... 3528867

[51] Int. Cl.⁴ .......................................... H05B 7/148
[52] U.S. Cl. ...................................... 373/70; 373/105; 373/50
[58] Field of Search ............... 373/42, 47, 48, 49, 373/50, 52, 70, 67, 69, 103, 102, 104, 105, 108

[56] References Cited

U.S. PATENT DOCUMENTS

| | | | |
|---|---|---|---|
| 3,272,905 | 9/1966 | Wooding | 373/70 |
| 3,379,818 | 4/1968 | Wynne | 373/70 |
| 3,562,393 | 2/1971 | Jackson | 373/70 |
| 3,594,486 | 7/1971 | Jellinghaus | 373/103 |
| 3,614,284 | 10/1971 | Scheidig | 373/70 |
| 3,622,678 | 11/1971 | Allen | 373/49 |
| 3,868,473 | 2/1975 | Dimick | 373/70 |
| 4,002,816 | 1/1977 | Zhupakhin | 373/70 |
| 4,131,754 | 12/1978 | Roberts | 373/70 |
| 4,303,797 | 12/1981 | Roberts | 373/52 |
| 4,569,056 | 2/1986 | Veil, Jr. | 373/49 |

FOREIGN PATENT DOCUMENTS 1918713 8/1971 Fed. Rep. of Germany .
2905752 9/1980 Fed. Rep. of Germany .

Primary Examiner—Roy N. Envall, Jr.
Attorney, Agent, or Firm—Steele, Gould & Fried

[57] ABSTRACT

A compensation device for the influence of the weight of a power feed line on a weight measurement device determining the weight of an electrode and/or the melting rate in an electro-slag remelting process, in a vacuum arc furnace or the like. When an x-y device is adjusted, a weight jump occurs due to the forces of the power cable or the forces of the bellows, which has a disturbing effect on the rate definition. This weight jump can be prevented by means of mechanical devices, or can be made so small that it no longer constitutes a disturbance. However, the expenditure for this is disproportionately high. The invention is more cost efficient, since hardware or software means suffice. The weight function $G=f(t)$ is extrapolated and compared with the actually measured weight $G'=f(t)$. The magnitude of the difference between the two is stored and later added as a correction value.

16 Claims, 2 Drawing Sheets

COMPENSATION FOR POWER FEED LINE WEIGHT IN WEIGHT MEASUREMENT DEVICES

FIELD OF THE INVENTION

The invention relates to methods and apparatus for compensating for the influence of the weight of a power feed line on a weight measuring device.

DESCRIPTION OF THE PRIOR ART

In vacuum arc furnaces (VAR) and electro-slag remelting furnaces (ESU), the burn-off rate of the electrode is frequently maintained at a constant value by means of a so-called melting rate control. The actual weight of the electrode is established, and the melting rate is determined from the change of the electrode weight. The value thus obtained for the actual melting rate is compared with a nominal melting rate, and differential value is used for determining a control value for the feed of melting current.

The current through the electrode and the electrode rod is fed through short and flexible high voltage cables which are led over a support point. The support point is not included in the weighing and does not participate in the vertical movement of the electrode. Long, flexible lines, which equalize the lift of the electrode rod, lead from the support point to a fixed point on the furnace. This arrangement eliminates various forces from the movement of the long, flexible lines.

It is already known how to change the angular position of an electrode mounting body my means of a specific adjustment device for the electrode, whereby the adjustment device is provided with two defined rotation axes perpendicular to one another and connected to independently activated adjustment drives (See DE-OS No. 2 905 752). In order to eliminate the influence of the weight of the power feed by means of an arrangement as described, for example, in DE-PS No. 1 918 713, relatively high mechanical investments are required, for example by providing an additional interim support point for the power cable, which support is included in the weighing.

SUMMARY OF THE INVENTION

Consequently, the object of the invention is to create a device, by means of which it is possible to eliminate, without mechanical means, that weight error which otherwise occurs in an x-y shift due to bending of the power cable between the weighed and the unweighed part of the installation.

These and other objects are accomplished by a method for compensating for the influence of the weight of a power feed line in a weight measurement apparatus for the weight of an electrode during melting in electro-slag remelting processes, in vacuum arc furnaces and the like, the influence varying for each lateral change in position of the electrode. The method comprises the steps of: identifying a first function $G=f(t)$, wherein G is the predicted weight of an electrode, the first function including a correction value; identifying a second function $G'-f(t)$, wherein G is the actual weight of the electrode; predicting the weight G of the electrode utilizing the first function for each lateral change in position of the electrode during melting, during a time interval $\Delta t$; weighing the electrode during each time interval $\Delta t$ to determine the actual weight by utilizing the second function; and, determining the difference $\Delta G$ between the predicted weight and the measured weight at the end of each time interval $\Delta t$, each $\Delta G$ being factored into the first function as the correction value for the next subsequent predicting step, whereby the actual weight of the electrode can be accurately predicted and current supplied thereto can be precisely controlled to optimize the melting.

The method may further comprise the steps of: transmitting signals corresponding to the weight and position of the electrode and corresponding to the intensity of current supplied to the electrode to a computer; performing the predicting and the weighing and difference determining steps by operations in the computer; controlling the horizontal and vertical movement of the electrode by signals generated by the computer; and, controlling the intensity of current supplied to the electrode by signals generated by the computer.

The method may be facilitated by adding the weight of an electrode mounting means to the weight of the electrode for purposes of the predicting and weighing steps, or by adding the weight of an electrode rod to the weight of the electrode for purposes of the predicting and the weighing steps.

These and other objects are also accomplished by an apparatus for compensating for the influence of the weight of a power feed line in a weight measurement device for the weight of an electrode during melting in electro-slag remelting processes, in vacuum arc furnaces and the like, the influence varying for each lateral change in position of the electrode, the apparatus comprising: means for calculating a first function $G=f(t)$, wherein G is the predicted weight of an electrode, the first function including a correction value; means for calculating a second function $G'=f(t)$, wherein G is the actual weight of the electrode; means for predicting the weight G of the electrode by utilizing the first function, for each lateral change in position of the electrode during melting, during a time interval $\Delta t$; means for weighing the electrode during each time interval $\Delta t$ to determine the actual weight, by utilizing the second function; and, means for determining the difference $\Delta G$ between the predicted weight and the measured weight at the end of each time interval $\Delta t$, each $\Delta G$ being factored into the first function as the correction value for the next subsequent prediction, whereby the actual weight of the electrode can be accurately predicted and current supplied thereto can be precisely controlled to optimize the melting. The apparatus may further comprise a computer for calculating the first function, the second function and the difference between the measured and predicted weights, the computer being digital or analog.

The apparatus preferably comprises means controlled by the computer for horizontally and vertically positioning the electrode and means controlled by the computer for supplying current to the electrode.

Such an apparatus may also comprise means for transmitting signals to the computer corresponding to the position of the electrode and corresponding to the intensity of current delivered to the electrode, whereby the melting can be optimally and automatically controlled by the computer.

An electrode carrier for holding and positioning the electrode may comprise at least one tacho-alternator for monitoring movements of the electrode.

It is a particular advantage of the invention that only an analog or digital switching arrangement is required in order to eliminate the disturbing influence of the feed lines.

BRIEF DESCRIPTION OF THE DRAWINGS

There are shown in the drawings forms which are presently preferred; it being understood, however, that the invention is not limited to the precise arrangements and instrumentalities shown.

DETAILED DESCRIPTION OF THE PREFERRED EMBODIMENTS

Figure 1:
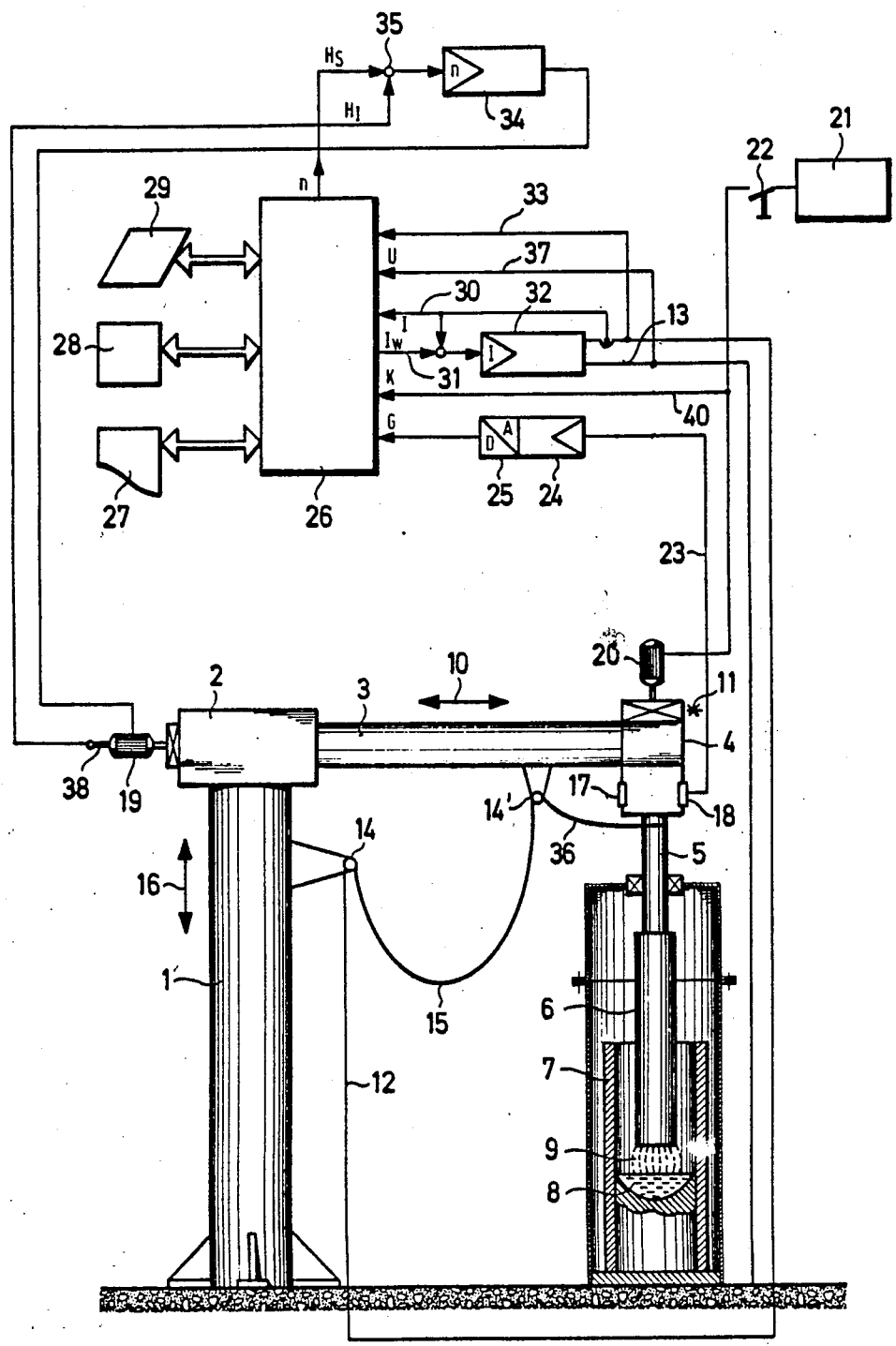
FIG. 1 shows a device according to the invention with a control for a burn-off electrode; and, FIG. 2 is a graphic representation explaining the principle of the invention.

A measuring device according to the invention is shown in FIG. 1. The device has a standard 1 guiding an electrode carrier 2, which supports a support arm for the electrode with a device 4 for holding the electrode. An electrode rod 5 is attached on this electrode holding device 4. The rod 5 contains a burn-off electrode 6 extending into an upright crucible 7. On the bottom of this upright crucible 7, there is a block 8 of solidified material which has previously been melted off by the burn-off electrode 6. A light arc is represented between this block 8 and the burn-off electrode 6.

The electrode holding device 4 can be moved laterally in directions x and y (i.e., perpendicularly to one another in horizontal planes), as indicated by the arrows 10 and 11.

The electrical energy required for melting the electrode 6 is provided via lines 12, 13 whereby one polarity of a DC voltage is applied to the block 8 while the other polarity of this DC voltage is applied to the electrode rod 5. The DC voltage applied to the block 8 is provided via the line 13, a relatively thick cable which has a fixed position and does not change its spatial location during the operation of the device.

By contrast, the line 12 is drawn over cable guides 14 and 14' to the electrode rod 5. Between the cable guides 14 and 14', the line 12 forms a U-shaped loop 15. Such a loose laying of the line 12 is required because the electrode carrier 2 can move in a vertical direction (direction z) on the standard 1, as indicated by the arrow 16. The electrical connection between the cable guide 14' and the electrode rod 5 is formed by the flexible line portion 36. It provides the current connection between the weighed electrode rod 5 and the moving, unweighed power cable 15. If the electrode carrier moves downward, the loop 15 becomes larger. Weight measurement boxes are identified with 17, 18.

Two drives 19, 20 are provided for the movement of the electrode rod 5 and, consequently, the electrode 6. The drive 19 is responsible for the vertical movement of the electrode carrier, i.e. to a certain extent for the z direction, while the drive 20 handles the movement of the electrode holding device in the x or y directions. The power supply for the drive 20 is provided by the energy supply device 21 and the switch 22.

A line 23 leads from the weight measurement boxes 17, 18 over which line measurement data are transmitted in the form of electrical data to a measurement amplifier 24, connected to an analog/digital converter 25. The measurement amplifier 24 and the A/D converter are not separately represented, since they may be designed as one component unit. The output of the A/D converter 25 is input into a microcomputer 26, which controls a printer 27 and/or a screen 28 and which can be operated via a keyboard 29. The microcomputer 26 processes the input information and, via control lines 30 and 31, controls a power supply 32 to which the lines 12, 13 are connected.

The currents flowing through the lines 12, 13 are captured by the line 33 and are returned to the microcomputer 26. This activates an adding device 35 of a motor control switching 34 with a nominal value of $H_S$, from which an actual value $H_I$ is subtracted by means of a tacho-generator 38. The difference between nominal and actual values is input into the motor control switching 34, which correspondingly controls the motor 19. The adjustments made by the motor 20 are also repeated to the microcomputer 26 via the line 36.

At the beginning of the electrode melting process, the weight of the electrode 6, i.e. the weight of the electrode 6 plus the tare weight of the electrode rod 5, is measured and input into the microcomputer 26 via the line 23, the amplifier 24, and the A/D converter 25. This weight measurement lasts for a specific time period $t_1$, within which the weight influence of the line 12 is still negligible, namely even when the electrode 6 is moved in a vertical direction. Based on these measurements, the microcomputer 26 establishes a specific melting rate. If the electrode tip is not centered in the crucible, the electrode 6 is re-centered during the melting by means of the x-y correction device. This is necessary primarily if an electrode is used which is curved like banana. It is important for the result of the melting that the electrode tip be centered in the crucible.

If the electrode 6 is moved in an x-/y direction (i.e., x or y, or both), the line 36 is slightly deformed, and the weight measured by the measurement boxes 17, 18 does not coincide with the actual weight of the electrode. The deformation forces of the power cable 36 remain constant between the sporadically performed x-/y adjustments and change during the x-/y adjustments. The adjustments with the x-/y adjustment device according to the invention affect the weight measurement device in the form of weight jumps. The melting rate is generated by means of differentiation of the weight signal. Consequently, a weight jump represents a significant disturbance of the melting rate definition and consequently also of the rate control. In order to guarantee a correct lowering of the electrode 6 in such a case as well, the microcomputer 26 projects the true weight of the electrode 6 during an x-/y correction, based on the previously established melting rate, i.e. it extrapolates the previous melting rate in a linear manner. Simultaneously, the microcomputer constantly calculates the deviation between the projected "true" weight value and the actually weighed weight value.

After conclusion of an x-/y correction process and after re-stabilization, the deviation of the tare is added, and subsequently, the melting rate is calculated from the weight decrease as prior to the adjustment action.

Figure 2:
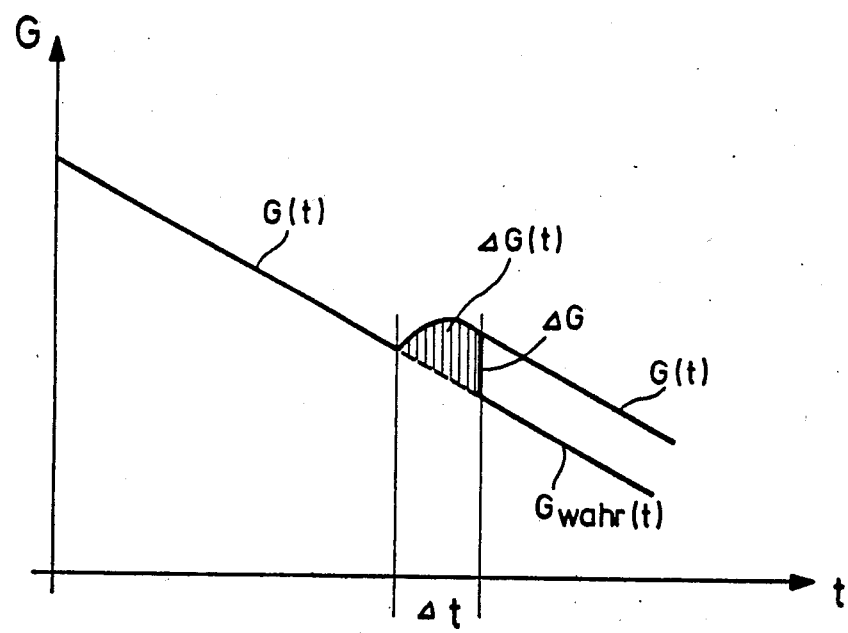

FIG. 2 shows a graphic representation illustrating the correction of the electrode lowering control. The progression of weight over time can be seen. The thick line represents G(t) and shows a "jump" at t. The magnitude of the weight jump is identified as G. Below the jump, the curve G(t) is at first a dashed line and thereafter continued as a solid line in a linear manner. The extended line is identified as $G_{wahr}$.

The device represented in FIG. 1 refers to the VAR process and not to the ESU process. Nevertheless, the invention is correspondingly applicable in the ESU process, and an additional illustration is unnecessary.

In the device according to the invention, it has been taken into consideration that the true melting rate be changed after a correction of the electrode in the crucible.

This was clearly demonstrated in the ESU process, and it may occur in the VAR process. Consequently, the sensing of the rate control should be as brief as possible.

As already indicated above, the alternative conditions should be distinguished for the device according to the invention: that an x-y adjustment is activated or not activated. In case no x-y adjustment is activated, or is not activated during the last few seconds (e.g. 20 seconds), the digitalized weight value is treated normally. The weight value is corrected by the previously input tare value—i.e. the dead mass with the furnace gantry included in the weighing—as well as by a previously established correction value. The weight signal corrected in this manner is forwarded for determination of the rate.

In case the x-y adjustment is activated—and for a few seconds (e.g. 20 seconds) thereafter—the cyclical signal values for the weight are projected on the basis of the melting rate established up to that time, and simultaneously, the deviation between the weight value projected in this manner and the actual weighed value is constantly defined. This value is the new correction value. This correction value is changed until the x-y adjustment is concluded and until a few seconds have been allowed for the hunting by the weight measurement device to stabilize.

If m identifies the actual weight which affects the calculation cycle for the establishment of the melting rate and the logical decision (e.g. start-hot-topping), if, further, $m_{-1}$ identifies the last actual weight value and $m_{Mess}$ is the actual weight measurement value, while $\dot{m}$ is the established melting rate, the following applies when no x-y adjustment is activated:

$$m = m_{Mess} - m_{Tar} + \Delta m.$$

If, on the other hand, the x-y adjustment is activated, the following applies $$m = m_{-1} - \dot{m} \cdot \Delta t$$

$$m = m - (m_{Mess} - m_{Tar})$$

whereby $m_{Tar}$ stands for the taring weight during the taring.

What is claimed is:

1. A method for compensating for the influence of the weight of a power feed line in a weight measurement apparatus for the weight of an electrode during melting in electro-slag remelting processes, in vacuum arc furnaces and the like, the influence varying for each lateral change in position of the electrode, the method comprising the steps of:

identifying a first function $G = f(t)$, wherein G is the predicted weight of an electrode, the first function including a correction value;

identifying a second function $G' = f(t)$, wherein G is the actual weight of the electrode;

predicting the weight G of the electrode utilizing the first function for each lateral change in position of the electrode during melting, during a time interval $\Delta t$;

weighing the electrode during each time interval $\Delta t$ to determine the actual weight by utilizing the second function; and, determining the difference $\Delta G$ between the predicted weight and the measured weight at the end of each time interval $\Delta t$, each $\Delta G$ being factored into the first function as the correction value for the next subsequent predicting step, whereby the actual weight of the electrode can be accurately predicted and current supplied thereto can be precisely controlled to optimize the melting.

2. The method of claim 1, comprising the step of adding the weight of an electrode mounting means to the weight of the electrode for purposes of predicting and the weighing steps.

3. The method of claim 1, comprising the step of adding the weight of an electrode rod to the weight of the electrode for purposes of the predicting and the weighing steps.

4. The method of claim 1, further comprising the step of controlling the horizontal and vertical movement of the electrode by signals generated by a comptuer.

5. The method of claim 1, further comprising the step of controlling the intensity of current supplied to the electrode by signals generated by a computer.

6. The method of claim 1, further comprising the steps of:

transmitting signals corresponding to the weight and position of the electrode and corresponding to the intensity of current supplied to the electrode to a computer;

performing the predicting and the weighing and difference determining steps by operations in the computer;

controlling the horizontal and vertical movement of the electrode by signals generated by the computer; and, controlling the intensity of current supplied to the electrode by signals generated by the computer.

7. An apparatus for compensating for the influence of the weight of a power feed line in a weight measurement device for the weight of an electrode during melting in electro-slag remelting processes, in vacuum arc furnaces and the like, the influence varying for each lateral change in position of the electrode, the apparatus comprising:

means for calculating a first function $G = f(t)$, wherein G is the predicted weight of an electrode, the first function including a correction value;

means for calculating a second function $G' = f(t)$, wherein G is the actual weight of the electrode;

means for predicting the weight G of the electrode by utilizing the first function, for each lateral change in position of the electrode during melting, during a time interval $\Delta t$;

means for weighing the electrode during each time interval $\Delta t$ to determine the actual weight, by utilizing the second function; and, means for determining the difference $\Delta G$ between the predicted weight and the measured weight at the end of each time interval $\Delta t$, each $\Delta G$ being factored into the first function as the correction value for the next subsequent prediction, whereby the actual weight of the electrode can be accurately predicted and current supplied thereto can be precisely controlled to optimize the melting.

8. The apparatus of claim 7, further comprising a computer for calculating the first function, the second function and the difference between the measured and predicted weights.

9. The apparatus of claim 8, further comprising means controlled by the computer for horizontally and vertically positioning the electrode.

10. The apparatus of claim 8, further comprising means controlled by the computer for supplying current to the electrode.

11. The apparatus of claim 9, further comprising means controlled by the computer for supplying current to the electrode.

12. The apparatus of claim 11, further comprising means for transmitting signals to the computer corresponding to the position of the electrode and corresponding to the intensity of current delivered to the electrode, whereby the melting can be optimally and automatically controlled by the computer.

13. The apparatus of claim 12, wherein the computer is a digital computer.

14. The apparatus of claim 12, wherein the computer is an analog computer.

15. The apparatus of claim 7, further comprising an electrode carrier for holding and positioning the electrode.

16. The apparatus of claim 15, further comprising at least one tacho-alternator for monitoring movements of the electrode.

* * * * *

UNITED STATES PATENT AND TRADEMARK OFFICE
CERTIFICATE OF CORRECTION

PATENT NO. : 4,742,528

DATED : May 3, 1988

INVENTOR(S) : Otto Stenzel

It is certified that error appears in the above-identified patent and that said Letters Patent is hereby corrected as shown below:

Column 5, line 7 delete "the" and insert --two-- therefor.

Column 5, line 45 should read as follows:

$$-- \Delta m = m - (m_{Mess} - m_{Tar}) --.$$

Signed and Sealed this

First Day of August, 1989

Attest:

DONALD J. QUIGG

Attesting Officer

Commissioner of Patents and Trademarks